HERMETICALLY SEALED POTENTIOMETERS

Filed Aug. 28, 1962

INVENTOR
Raymond W. Sargent

United States Patent Office 3,184,697

Patented May 18, 1965

3,184,697

HERMETICALLY SEALED POTENTIOMETERS

Raymond W. Sargent, Burlington, Vt., assignor to Samarius, Incorporated, Derby, Conn., a corporation of Connecticut Filed Aug. 28, 1962, Ser. No. 219,874
5 Claims. (Cl. 338—175)

This invention relates to potentiometers useful in electronic circuitry.

Within the electronic industry, the two most significant factors which have contributed so greatly toward the strides made in missile and computer technology is miniaturization and most particularly of late, reliability. Reliability is a combination of many obvious factors such as good design, careful selection of materials and painstaking workmanship, yet it has been apparent throughout the industry another factor is of fast growing importance. This concerns the process known as the hermetic sealing of the component from the surrounding atmosphere. The word hermetic has been misused and is misleading in many instances. However, a true hermetic seal, as defined by the military services, is one comprised of bonding metal to metal, metal to glass, or metal to ceramic.

It is one of the objectives of the present invention to provide a trimmer potentiometer whereby its internal construction is completely sealed in a true hermetic enclosure from the surrounding atmosphere and yet at the same time be of such small physical size as to be classified as a miniature component. Its over-all dimensions not exceeding ¼ inch diameter and ½ inch in length excluding wire leads or terminals. Heretofore, potentiometers are relatively large; conventionally the diameter is in excess of ½ inch and it is not uncommon for the length to exceed 1 inch. Furthermore heretofore no such conventional trimmer potentiometer embodies a true hermetic seal for both the rotatable end and the circuit terminal end simultaneously.

The significant reduction in physical size of this invention is attributed to the simplicity and unique manner by which a one piece round wire wiping contact is formed to serve as its own supporting shaft, crank arm and slidable electric spring contact.

Another object of the present invention affords the user the provision to soft solder the potentiometer into his particular device or assembly in such a manner that the rotatable end is readily accessible thus providing an adjustment feature as applied to his particular hermetically sealed enclosure. This would be of interest to the instrumentation field wherein circuit trimming adjustments may be conducted in an unfavorable atmosphere without the danger of contaminating the mechanism or circuit within the instrument proper.

Basically, the invention consists of a rotatable shaft at one end in which rotary motion is transmitted through a swivelling flexible metal bellows producing an orbiting action which in turn is employed to crank a slidable electric spring wiper, contacting an essentially circular resistance element, the electrical terminations of which are secured in a metal to glass or metal to ceramic hermetic feed-thru header at the opposite end thus providing a complete hermetic enclosure.

Further objects and advantages of the present invention will be apparent from further reading of the description, particularly when viewed in the light of the drawings, in which.

Figures 1, 2, 3:
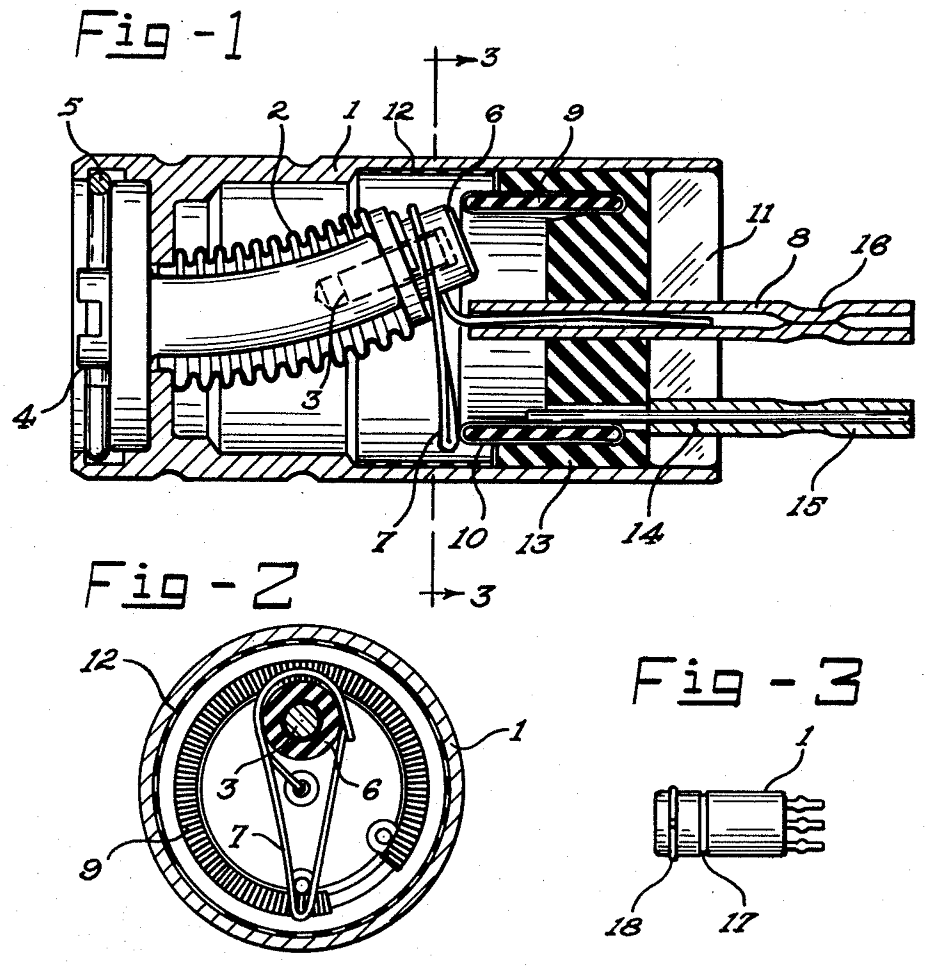
FIGURE 1 is a longitudinal section taken through the axis of the present invention.
FIGURE 2 is a cross section taken along the line 3—3 of FIGURE 1.
FIGURE 3 is an elevational view of the trimmer potentiometer according to the teachings of the present invention.
Figure 4:
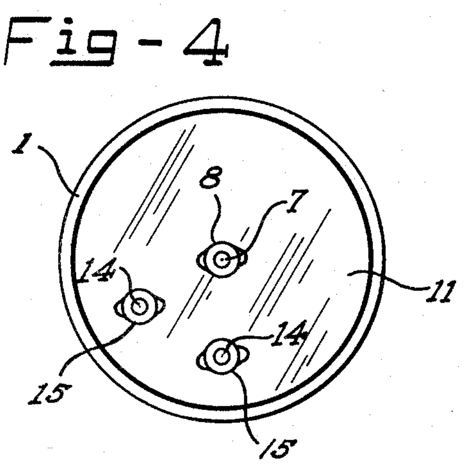
FIGURE 4 is an end view of the present invention showing the electrical terminations.

The potentiometer illustrated in the figures has a solderable cylindrical housing or body member 1 which has soldered to its internal flange a flexible metal bellows 2, the opposite end of which has pin 3 soldered thereto thus providing an airtight flexible bulkhead at one end of the bore within the housing. A shaft 4 is fitted and allowed to rotate within the housing 1. A suitable snap retaining ring 5 is interposed between an outer flange at one end of the body member 1 and the collar portion adjacent the outer end of the shaft member 4 to secure the shaft member 4 in mounted position with the collar portion immediately adjacent the inner or internal flange of the body member 1. The inner end portion of the shaft is bent to offset the inner end thereof from the axis of the bore to provide the shaft member 4 with a crank-like action. The inner end of the shaft 4 has a blind hole or bore centrally located therein which rotatably receives the interior portion of pin 3 and secures the bellows member 2 and the shaft member 4 in generally concentric relationship at the inner end of the shaft member 4, thus minimizing wearing contact therebetween during rotation of the shaft member 4. The outer end portion of the shaft member 4 is rotatably mounted in the body member 1 and is generally coaxial with the bore. A slit in the outer end of the shaft member 4 is engageable with a screw driver or the like for convenient rotation of the shaft member 4. Rotatably mounted on the exterior portion of the pin 3 is a bushing 6 of non-conductive material which has a body portion and a flange portion at the end thereof adjacent to the bellows member 2.

A wiper contact 7 formed of precious metal round wire and of spring temper is bent or coiled in such a manner as to grasp or non-rotatably engage with the outside diameter of the insulating bushing 6 while one end is journaled to rotate within a portion of the internal diameter of the tubular portion of the electrically conductive tube 8 located on the common axis. As is apparent from the drawing, the flange portion of the bushing 6 prevents electrical contact between the contact member 7 and the bellows member 2. One portion of the wiper contact 7 is formed into a loop which extends generaly radially from the bushing 6 to make substantial spring contact against the end periphery of the resistance element 9. Rotation of the shaft member 4 causes the inner end thereof, the sealed end of the bellows member 2, and the bushing 6 to crank or orbit about the axis of the bore. The bushing 6 causes the wiper contact 7 to pivot about the tube 8 and the free end of the radially projecting portion of the wiper contact 7 scans the end periphery of the generally annular resistance element 9.

A high dielectric tape 12 is applied to the inside diameter of the housing 1 to prevent high voltage breakdown between the end of the wiper 7 and the housing 1.

Electrical continuity will occur through the center tube 8 which is bonded for a hermetic seal to the sealing means at the other end of the bore and illustrated herein as a glass or ceramic insulator 11, thence through the rotatable wiper 7 which in turn is insulated from the housing 1 by means of the insulating bushing 6, thence through the winding of the resistance element 9 which is located centrally about the common axis and insulated from the housing 1 by means of an electrically non-conducting drum 13. The end turns 10, of the resistance element 9 are electrically connected to wires 14 which pass through orifices in drum 13 and extend full length into the inside diameter of tubes 15 which in turn are bonded for a hermetic seal to glass or ceramic insulator 11.

The outer periphery of the insulator 11 being metallized is soldered to the inside diameter of housing 1.

In order to prevent the entry of atmosphere the tubes 8 and 15 are resistance welded as shown at 16 thus providing a true hermetically sealed enclosure.

FIGURE 3 illustrates a manner in which the invention may be mounted. Annular grooves 17 on the outside diameter of housing 1 accommodate a solderable snap ring 18 which serves as a locating abutment during the soldering operation conducted by the user onto his particular piece of equipment.

What is claimed is:

1. A potentiometer comprising a body member having a bore therein; a crank-like shaft member extending into said bore from one end thereof, said shaft member having an outer end portion substantially coaxial with said bore and having an inner end portion offset with respect to the axis of said bore, said outer end portion of said shaft member being rotatably mounted upon said body member adjacent said one end of said bore and being adapted to be rotated by associated rotating means, said inner end portion of said shaft member being adapted to orbit freely about the axis of said bore when said shaft member is rotated; a fluid-tight bellows member of relatively flexible material disposed about said shaft member from said one end of said bore to said inner end portion of said shaft member, said bellows member being bonded about the periphery of one end thereof to said body member in hermetically sealed relationship therewith adjacent said one end of said bore, the other end of said bellows member being sealed inwardly of said bore from the inner end portion of said shaft member and thus cooperating with said body member to provide a hermetic seal at said one end of said bore; a generally annular resistance element mounted coaxially in said bore and having electrical conducting means communicating with the exterior of said body member, said conducting means being hermetically sealed within said body member; sealing means providing a hermetic seal for said bore adjacent the other end thereof; and a unitary contact member of electrically conductive resilient material, said contact member being rotatably engaged with said other end of said bellows member and having a portion thereof extending generally radially from said other end of said bellows member and formed in a wiper arm biased in resilient contact with said resistance element, said contact member having one end thereof rotatably journaled within an electrical conducting means centrally positioned within said bore and communicating with the exterior of said body member, said contact member conducting means being in hermetically sealed relationship with said body member.

2. A potentiometer comprising a body member having a bore therein; a crank-like shaft member extending into said bore from one end thereof, said shaft member having an outer end portion substantially coaxial with said bore and having an inner end portion offset with respect to the axis of said bore, said outer end portion of said shaft member being rotatably mounted upon said body member adjacent said one end of said bore and being adapted to be rotated by associated rotating means, said inner end portion of said shaft member being adapted to orbit freely about the axis of said bore when said shaft member is rotated; a fluid-tight bellows member of relatively flexible material disposed about said shaft member from said one end of said bore to said inner end portion of said shaft member, said bellows member being bonded about the periphery of one end thereof to said body member in hermetically sealed relationship therewith adjacent said one end of said bore, the other end of said bellows member being sealed inwardly of said bore from the inner end portion of said shaft member and thus cooperating with said body member to provide a hermetic seal at said one end of said bore; a generally annular resistance element mounted coaxially in said bore and having electrical conducting means communicating with the exterior of said body member, said conducting means being in hermetically sealed relationship with said body member; sealing means providing a hermetic seal for said bore adjacent the other end thereof; and a spring contact member of electrically conductive resilient material, said contact member being rotatably engaged with said other end of said bellows member and having a portion thereof extending generally radially from said other end of said bellows member to said resistance element, said contact member being biased against said resistance element by the resilience of the material thereof, said contact member having one end thereof pivotably mounted coaxially within said bore with electrical conducting means communicating with the exterior of said body member, said contact member conducting means including a tubular contact coaxial with said bore and mounted in said sealing means adjacent said other end of said bore in hermetically sealed relationship therewith, and having said one end of said contact member rotatably received within said tubular contact and in electrical contact therewith.

3. A potentiometer comprising a body member having a bore therein; a crank-like shaft member extending into said bore from one end thereof, said shaft member having an outer end portion substantially coaxial with said bore and having an inner end portion offset with respect to the axis of said bore, said outer end portion of said shaft member being rotatably mounted upon said body member adjacent said one end of said bore and being adapted to be rotated by associated rotating means, said inner end portion of said shaft member being adapted to orbit freely about the axis of said bore when said shaft member is rotated; a fluid-tight bellows member of relatively flexible material disposed about said shaft member from said one end of said bore to said inner end portion of said shaft member, said bellows member being bonded about the periphery of one end thereof to said body member in hermetically sealed relationship therewith adjacent said one end of said bore, the other end of said bellows member being sealed inwardly of said bore from the inner end portion of said shaft member and thus cooperating with said body member to provide a hermetic seal at said one end of said bore; a generally annular resistance element mounted coaxially in said bore and having electrical conducting means communicating with the exterior of said body member, said conducting means being in hermetically sealed relationship with said body member; sealing means providing a hermetic seal for said bore adjacent the other end thereof; and a spring contact member of electrically conductive resilient wire, said contact member being rotatably engaged with said other end of said bellows member by means of an assembly comprising a pin element extending generally axially through said other end of said bellows member with an interior portion extending interiorly of said bellows member and an exterior portion extending exteriorly of said bellows member, said other end of said bellows member being secured to said pin element and in hermetically sealed relationship therewith, and a bushing element of electrically non-conductive material rotatably mounted on the exterior portion of said pin element, said bushing element having a body portion and a radially outwardly extending flange portion at the end thereof adjacent said bellows member, said contact member having a coiled portion coiled tightly about said body portion of said bushing element in non-rotatable engagement therewith, said flange portion preventing electrical contact between said contact member and said bellows member, the inner end of said shaft member having a bore therein rotatably receiving said interior portion of said pin element to secure said shaft and bellows members in generally concentric relationship, said contact member having a portion thereof extending generally radially from said other end of said bellows member to said resistance element, said contact member being biased against said resistance element by the resilience of the material thereof, said contact member having one end thereof pivotably mounted coaxially within said bore with electrical conducting means communicating with the exterior of said body member, said contact member conducting means being in hermetically sealed relationship with said body member.

4. A potentiometer comprising a body member having a bore therein; a crank-like shaft member extending into said bore from one end thereof, said shaft member having an outer end portion substantially coaxial with said bore and having an inner end portion offset with respect to the axis of said bore, said outer end portion of said shaft member being rotatably mounted upon said member adjacent said one end of said bore and being adapted to be rotated by associated rotating means, said inner end portion of said shaft member being adapted to orbit freely about the axis of said bore when said shaft member is rotated; a fluid-tight bellows member of relatively flexible material disposed about said shaft member from one end of said bore to said inner end portion of said shaft member; means sealing one end of said bellows member about the periphery thereof to said body member in hermetically sealed relationship therewith adjacent said one end of said bore; means sealing the other end of said bellows member inwardly of said bore from the inner end portion of said shaft member, said bellows member thus cooperating with said body member to provide a hermetic seal at said one end of said bore; a generally annular resistance element mounted coaxially in said bore and having electrical conducting means communicating with the exterior of said body member, said conducting means being in hermetically sealed relationship with said body member, said resistance element and said conducting means being electrically insulated from said body member; sealing means providing a hermetic seal for said bore adjacent the other end thereof; and a spring contact member of electrically conductive resilient wire material, said contact member being rotatably engaged with said other end of said bellows member and electrically insulated therefrom and having a first portion extending generally radially from said other end of said bellows member to said resistance element, said contact member being biased against said resistance element into firm electrical contact therewith by the resilience of the material thereof, said contact member having a second portion extending coaxially with said bore toward said other end thereof; and contact member conductor means having a tubular portion mounted coaxially with respect to said bore in said sealing means adjacent said other end of said bore and in hermetically sealed relationship therewith, said second portion of said contact member being rotatably received within said tubular portion and in electrical contact therewith.

5. A potentiometer comprising a body member having a bore therein; a crank-like shaft member extending into said bore from one end thereof, said shaft member having an outer end portion substantially coaxial wtih said bore and having an inner end portion offset with respect to the axis of said bore, said outer end portion of said shaft member being rotatably mounted upon said body member adjacent said one end of said bore and being adapted to be rotated by associated rotating means, said inner end portion of said shaft member being adapted to orbit freely about the axis of said bore when said shaft member is rotated, the inner end of said shaft member having a bore therein; a fluid-tight bellows member of relatively flexible material disposed about said shaft member from said one end of said bore to said inner end portion of said shaft member, said bellows member being bonded about the periphery of one end thereof to said body member in hermetically sealed relationship therewith adjacent said one end of said bore; a pin element extending generally axially through the other end of said bellows member with an interior portion extending interiorly of said bellows member and an exterior portion extending exteriorly of said bellows member, said other end of said bellows member being bonded to said pin element in hermetically sealed relationship therewith inwardly of said bore from the inner end portion of said shaft member and thus cooperating with said body member to provide a hermetic seal at said one end of said bore, the interior portion of said pin element being rotatably received in said bore in the inner end of said shaft member to secure said shaft and bellows members in generally concentric relationship; a bushing element of electrically non-conductive material rotatably mounted on the exterior portion of said pin element, said bushing element having a body portion and a radially outwardly extending flange portion at the end thereof adjacent said bellows member; a generally annular resistance element mounted coaxially in said bore and having electrical conducting means communicating with the exterior of said body member, said conducting means being in hermetically sealed relationship with said body member, said resistance element and said conducting means being electrically insulated from said body member; sealing means providing a hermetic seal for said bore adjacent the other end thereof; a spring contact member of electrically conductive resilient wire material, said contact member being coiled about said body portion of said bushing element in non-rotatable engagement therewith, said bushing flange portion preventing electrical contact between said contact member and said bellows member, said contact member having a first portion extending generally radially from said bushing element to said resistance element and being biased thereagainst into firm electrical contact therewith by the resilience of the contact member material, said contact member having a second portion extending coaxially with said bore toward said other end thereof; and contact member conductor means having a tubular portion mounted coaxially with respect to said bore in said sealing means adjacent said other end of said bore and in hermetically sealed relationship therewith, said second portion of said contact member being rotatably received within said tubular portion and in electrical contact therewith.

References Cited by the Examiner

UNITED STATES PATENTS

| | | | |
|---|---|---|---|
| 2,798,137 | 7/57 | Rasmussen | 338—174 |
| 2,857,496 | 10/58 | Louis | 338—164 |
| 2,873,339 | 2/59 | Bourns et al. | 338—164 X |
| 2,874,253 | 2/59 | Sharp et al. | 338—164 |
| 2,884,506 | 4/59 | Graustein | 338—175 X |

RICHARD M. WOOD, *Primary Examiner.*

ANTHONY BARTIS, *Examiner.*